(12) United States Patent
Li

(10) Patent No.: US 11,340,655 B2
(45) Date of Patent: May 24, 2022

(54) ELECTRONIC DEVICE

(71) Applicant: Lenovo (Beijing) Co., Ltd., Beijing (CN)

(72) Inventor: Futeng Li, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/728,704

(22) Filed: Dec. 27, 2019

(65) Prior Publication Data

US 2020/0209913 A1     Jul. 2, 2020

(30) Foreign Application Priority Data

Dec. 29, 2018  (CN) .......................... 201811642670.8

(51) Int. Cl.
*G06F 1/16*     (2006.01)

(52) U.S. Cl.
CPC ................... *G06F 1/163* (2013.01)

(58) Field of Classification Search
CPC ..................................... H05K 7/20
See application file for complete search history.

(56) References Cited

U.S. PATENT DOCUMENTS 10,156,727 B2    12/2018  Miller et al.

FOREIGN PATENT DOCUMENTS

| CN | 106249416 A | 12/2016 |
| CN | 107884933 A | 4/2018 |
| CN | 108415163 A | 8/2018 |
| CN | 108681072 A | 10/2018 |
| CN | 108957762 A | 12/2018 |
| WO | WO-2018113081 A1 * | 6/2018 ............. G06F 3/012 |

* cited by examiner

*Primary Examiner* — Jerry Wu
(74) *Attorney, Agent, or Firm* — Anova Law Group, PLLC

(57) ABSTRACT

An electronic apparatus is provided. The electronic apparatus includes: a main device; and a wearing device coupled to the main device. The wearing device is configured to provide an accommodating space that is dimension-adjustable. The accommodating space is configured to accommodate a body part of a wearer and to maintain a relative position relationship between the electronic apparatus and the wearer. The wearing device includes a first member and a second member. The first member is configured to adjust dimensions of the accommodating space through a first manner, the second member is configured to adjust dimensions of the accommodating space through a second manner, and the first manner is different from the second manner.

16 Claims, 7 Drawing Sheets

ELECTRONIC DEVICE

CROSS-REFERENCE TO RELATED APPLICATION

This application claims the priority to Chinese Patent Application No. 201811642670.8, entitled "Electronic Apparatus," filed on Dec. 29, 2018, the entire content of which is incorporated herein by reference.

TECHNICAL FIELD

The present disclosure relates to the technical field of electronic apparatus and, more particularly, to a wearable electronic apparatus.

BACKGROUND

Existing wearable electronic apparatus is often worn on a body part of the wearer through a wearing device. However, the accommodating space of a wearing device is often adjusted merely by varying the elastic force of the wearing device, which limits the adjustments of the accommodating space for the electronic apparatus.

SUMMARY

In one aspect of the present disclosure, an electronic apparatus is provided. The electronic apparatus includes: a main device and a wearing device coupled to the main device. The wearing device is configured to provide an accommodating space that is dimension-adjustable. The accommodating space is configured to accommodate a body part of a wearer and to maintain a relative position relationship between the electronic apparatus and the wearer. The wearing device includes a first member and a second member. The first member is configured to adjust dimensions of the accommodating space through a first manner, the second member is configured to adjust dimensions of the accommodating space through a second manner, and the first manner is different from the second manner.

In another aspect of the present disclosure, a method is provided. The method includes providing a main device and coupling a wearing device to the main device. The wearing device is configured to provide an accommodating space that is dimension-adjustable. The accommodating space is configured to accommodate a body part of a wearer and to maintain a relative position relationship between the electronic apparatus and the wearer. The wearing device includes a first member and a second member. The first member is configured to adjust dimensions of the accommodating space through a first manner, the second member is configured to adjust dimensions of the accommodating space through a second manner, and the first manner is different from the second manner.

BRIEF DESCRIPTION OF THE DRAWINGS

To more clearly illustrate embodiments of the present disclosure or technical solutions in prior art, drawings accompanying the disclosed embodiments or prior art are introduced briefly hereinafter. Obviously, the accompanying drawings in the following descriptions are merely some embodiments of the present disclosure, and for those ordinarily skilled in the relevant art, other drawings are obtainable from those drawings without creative labor.

DETAILED DESCRIPTION OF THE EMBODIMENTS

Figure 1:
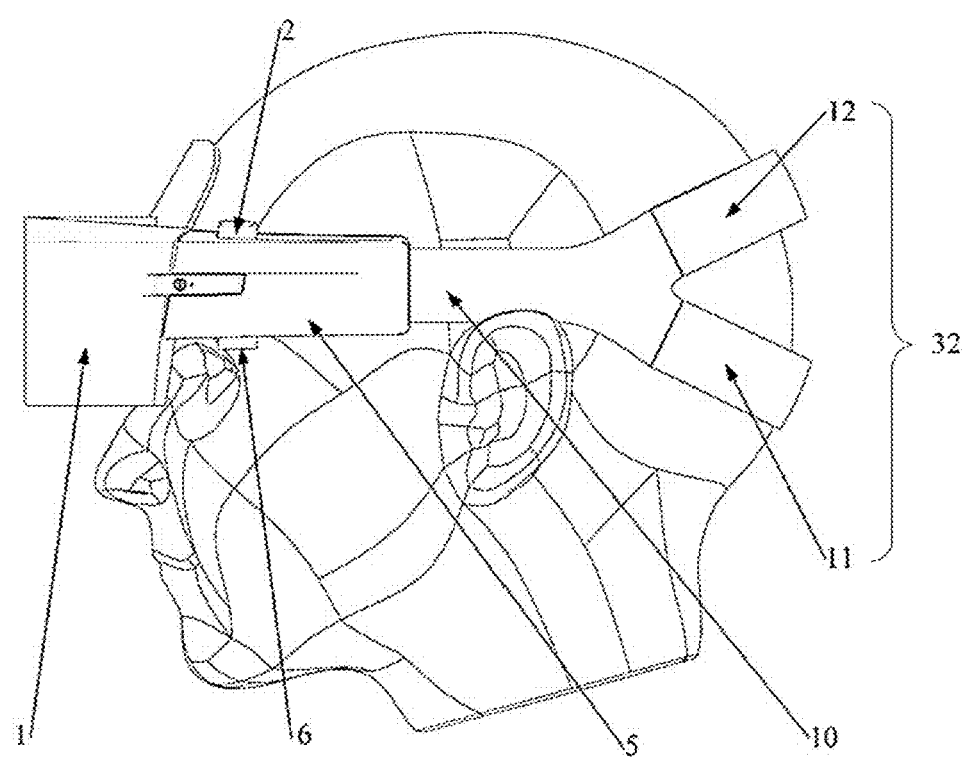
FIG. 1 illustrates a structural schematic view of an electronic apparatus when worn, according to some embodiments of the present disclosure.

To make clearer the objective, technical solutions, and advantages of the present disclosure, the present disclosure will be described with reference to the accompanying drawings. The embodiments described hereinafter are some but not all embodiments of the present disclosure. Based on those embodiments, all other embodiments obtainable by those ordinarily skilled in the relevant art without creative labor shall fall within the scope of the present disclosure.

The present disclosure provides an electronic apparatus that diversifies the manners to adjust the accommodating space of the electronic apparatus. The electronic apparatus may be, for example, an Augmented Reality (AR) apparatus or a Virtual Reality (VR) apparatus. The electronic apparatus may be a wearable apparatus, such as a helmet or a pair of glasses having a display function. The electronic apparatus may also be a watch, a pair of shoes, or clothing, that requires adjustment of the accommodating space.

In implementation, the electronic apparatus may include a main device, and a wearing device having a first member and a second member. The first member includes an accommodating space adjustment portion, and the second member includes an accommodating space adjustment portion. The accommodating space adjustment portion of the first member possesses a first elastic parameter, and the accommodating space adjustment portion of the second member possesses a second elastic parameter. The first and second elastic parameters may together determine the elasticity of the accommodating space adjustment portions of the first member and the second member.

The accommodating space adjustment portion of the first member that has the first elastic parameter may be configured to maintain the stability of the relative positions between the wearing device and the wearer, and the accommodating space adjustment portion of the second member that has the second elastic parameter may be configured to ensure the wearing comfort of the wearer. The first elastic parameter of the first member may be smaller than, or the same as the second elastic parameter of the second member.

In one example, the wearing device includes a combination of elastic belt and plastics, where the accommodating space adjustment portion of the first member is made of plastic for better stability. The accommodating space adjustment portion of the first member may also be made of a metallic material having a relatively small elastic parameter. The accommodating space adjustment portion of the second member may be made of an elastic belt to accommodate different shapes and dimensions of a human head, for better comfort.

The first member and the second member can be adjusted simultaneously to adjust the dimensions of the accommodating space. In some embodiments, the first member may be adjusted to adjust the dimensions of the accommodating space. In some embodiments, the second member may be adjusted to adjust the dimensions of the accommodating space. In some embodiments, the first member may be adjusted to enforce the second member to be adjusted, thus adjusting the dimensions of the accommodating space, for more convenient operations. Or, the second member may be adjusted to enforce the first member to be adjusted, thus adjusting the dimensions of the accommodating space.

The accommodating space adjustment portion of the first member and the accommodating space adjustment portion of the second member may adopt different manners to adjust the dimensions of the accommodating space. Accordingly, the manners to adjust the accommodating space of the electronic apparatus are diversified.

Figure 2:
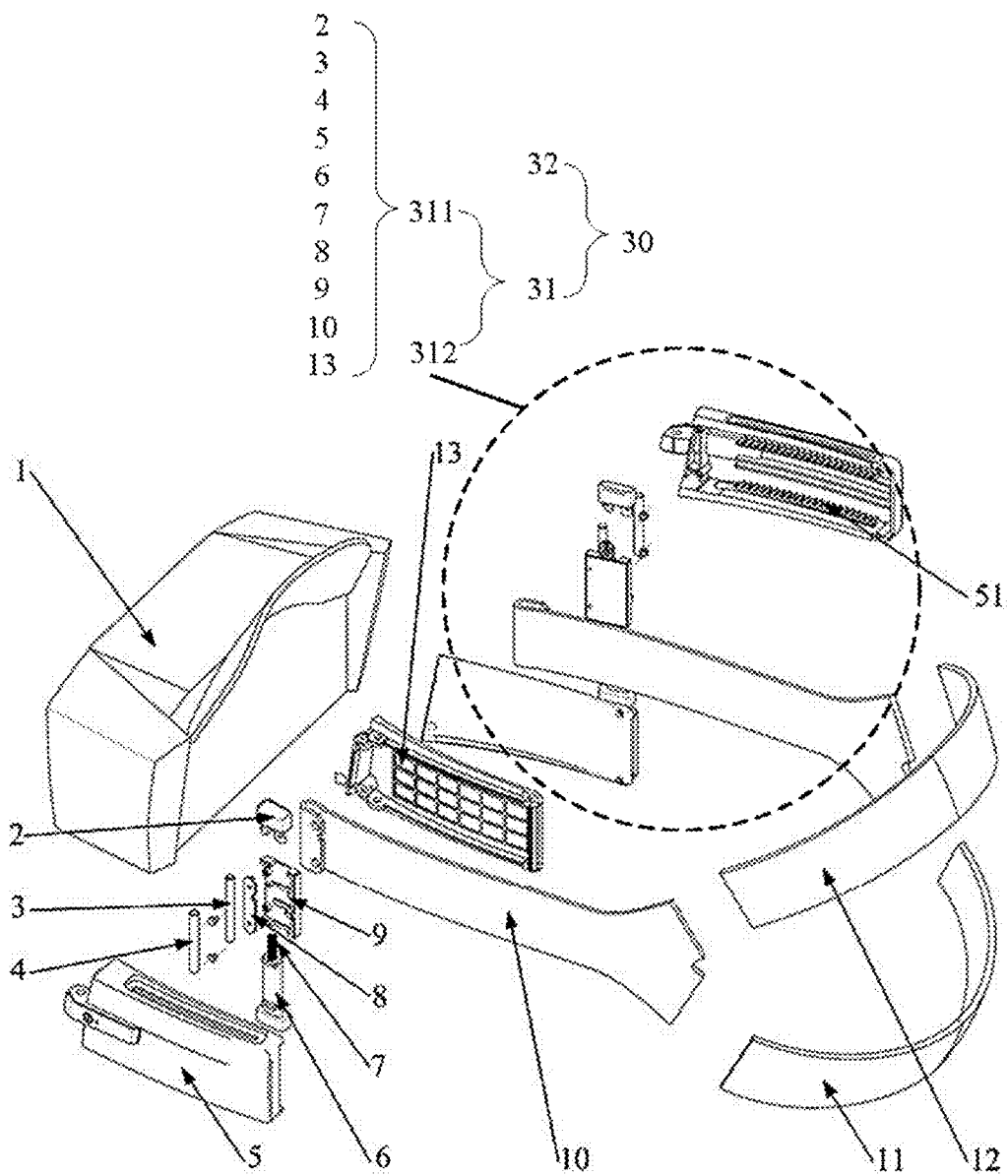
FIG. 2 illustrates an explosive view of an electronic apparatus according to some embodiments of the present disclosure.

FIG. 1 illustrates a structural schematic view of an electronic apparatus when worn, according to some embodiments of the present disclosure. FIG. 2 illustrates an explosive view of an electronic apparatus according to some embodiments of the present disclosure. As shown in FIG. 1 and FIG. 2, the electronic apparatus may include a main device 20 comprising a display module 1, and a wearing device 30 coupled to the main device 20. The display module 1 is configured to output display data. The wearing device 30 may include a first member 31, and a second member 32 coupled to the first member 31. The first member 31 is different from the second member 32.

The first member may include one or more support shells, one or more adjusting bands 10, a sliding block 9, a toggle button 2, a releasing button 6, and an elastic member 7 disposed between the toggle button 2 and the releasing button 6. The support shell may include an outer shell 5 and an inner shell 13. In some embodiments, the support shell may be configured with a revolving member, perpendicular to a first direction, where the first direction is a direction from the main device to the first member. The revolving member may include a rotating axis 3, and a sleeve 4 that is rotatably sleeved on the rotating axis 3.

Further, the adjusting band 10 may be partially disposed inside the support shell and be configured to adjust an overlapping degree of the adjusting band 10 along the first direction. An adjusting end of the adjusting band 10 may be folded around the revolving member so as to slide in cooperation with the support shell along the first direction. The sliding block 9 may be fixedly connected to an adjusting end of the adjusting band 10, and the support shell may include a guide slot to cooperate with the sliding of the sliding block 9. The toggle button 2 may slide along the first direction, in cooperation with the support shell. The releasing button 6 may be connected to the sliding block 9 and move along a direction perpendicular or substantially perpendicular to the first direction, in cooperation with the support shell. The elastic member 7 may be, for example, a spring with relatively high elasticity, or an elastic block. According to the present disclosure, the structure of the first member is relatively simple, easy to manufacture and assemble, and is convenient to operate.

In some embodiments, the adjusting band 10 forms the accommodating space adjustment portion of the first member, and the elastic parameter of the adjusting band 10 is relatively small, which can be non-elastic or low-elastic. The adjusting band 10 may, through the first manner, achieve different overlapping degrees, thereby adjusting the dimensions of the accommodating space. The first manner to achieve different overlapping degrees may include roll-feed, cascading, and plug-in. Optionally, the first manner may also adjust the dimensions of the accommodating space by selecting different numbers of splicing blocks or splicing blocks of different widths.

In some embodiments, the first member may be in other structural forms. For example, the first member may include an inner adjusting board and an outer sleeve 4. By adjusting the extent of the adjusting end of the inner adjusting board into the outer sleeve 4, similar effect of overlapping degree adjustment may be achieved.

In some embodiments, the first member includes a first sub-unit 311 and a second sub-unit 312, where the first sub-unit 311 is configured to connect to a first end of the main device 20 and a third end of the second member 32, and the second sub-unit 312 is configured to connect a second end of the main device 20 and a fourth end of the second member 32. The first end is opposite to the second end, and the third end is opposite to the fourth end. The first sub-unit 311 and the second sub-unit 312 may be symmetrically disposed at two ends of the main device. The first sub-unit 311 and the second sub-unit 312 may both be configured to adjust the dimensions of the accommodating space, and both possess the first state and second state. Optionally, only one of the two sub-units (i.e., the first sub-unit and the second sub-unit) may adjust the dimensions of the accommodating space, having the first state and second state. To simplify the structure, the first sub-unit and the second sub-unit may have the same structure. In some situations, the first sub-unit and the second sub-unit may have different structures.

The second member may include a first local part 12 and a second local part 11. In implementation, the first local part 12 may include a first elastic band, and the second local part 11 may include a second elastic band. The second member may include one or more interval regions, and the one or more interval regions may make the second member hollow, thus increasing the overall coverage area of the second member, while at the same saving materials and facilitating the exhaustion of the air. For example, the first local part 12 and the second local part 11 may respectively include an interval. One end of the first local part 12 and one end of the second local part 11 may be coupled to form the third end of the second member that connects to the aforementioned first sub-unit, and the other ends of the first local part 12 and the second local part 11 may be coupled to form the fourth end of the second member that connects to the aforementioned second sub-unit.

In some embodiments, the first local part 12 and the second local part 11, with respect to the wearer's head, may be top-and-bottom spaced. After the wearer wears the wearable electronic apparatus, the first local part 12 is located higher than the center of the main device, and the second local part 11 is located below than the center of the main device. Accordingly, the area of the adhering region is increased, the wearing of the electronic apparatus is secured, and the relatively good breathability is guaranteed.

In some embodiments, first local part 12 and the second local part 11 may be left-and-right spaced, tilted, or overlapped. The first local part 12 and the second local part 11 may also be disposed in parallel or not in parallel.

In some embodiments, the second member may include a plurality of local parts, disposed in a grid pattern. According to the present disclosure, the accommodating space adjustment portion of the second member formed by the first local part 12 and the second local part 11 has a relatively simple structure.

According to the present disclosure, the wearing device and the main device may be coupled to form an accommodating space that is dimension adjustable. After accommodating a body part of a wearer (e.g., the wearer's head), the accommodating space may be adjusted using the wearing device to maintain the electronic apparatus in a stable position with respect to the wearer. To adjust the accommodating space, the first member of the wearing device may adjust dimensions of the accommodating space through a first manner, and the second member of the wearing device may adjust dimensions of the accommodating space through a second manner.

In some embodiments, the accommodating space formed by coupling the wearing device to the main device is an accommodating space formed by the wearing device itself. In some embodiments, the accommodating space formed by coupling the wearing device to the main device is an accommodating space formed by the wearing device in cooperation with the main device.

According to the present disclosure, the first member of the wearing device may adjust the dimensions of the accommodating space through the first manner. For example, the first member may have a first state and a second state, where the first state is a state showing increased dimensions of the accommodating space, and the second state is a state showing reduced dimensions of the accommodating space. The first manner may, by adjusting the positional relationship, bring the first member in the first state or the second state, thereby adjusting the dimensions of the accommodating space. Optionally, the first member may adjust the dimensions of the accommodating space though other manners, such as binding.

According to the present disclosure, the second member of the wearing device may adjust the dimensions of the accommodating space through the second manner. For example, the second member may have a third state and a fourth state, where the third state is a state showing increased dimensions of the accommodating space, and the fourth state is a state showing reduced dimensions of the accommodating space. The second manner may vary the second member in the third state or the fourth state through elastic deformation, to adjust the dimensions of the accommodating space. Optionally, the second member may adjust the dimensions of the accommodating space through other manners, such as using multiple rows of buckles, or multiple hook-and-loop fasteners.

As such, the wearing device may adjust the dimensions of the accommodating space through two manners: the first manner and the second manner, which increases the manners of adjusting the accommodating space. For example, by adjusting the structural positional relationship of the accommodating space adjustment portion of the first member, the present disclosure enlarges or reduces the dimensions of the accommodating space, thereby conveniently adjusting the dimensions of the accommodating space. By adjusting the degree of elastic deformation of the accommodating space adjustment portion of the second member, the present disclosure enlarges or reduces the dimensions of the accommodating space, thereby conveniently adjusting the dimensions of the accommodating space.

According to the present disclosure, the display module may be configured to output display data towards the accommodating space. Accordingly, while the accommodating space may, after accommodating the wearer's head, enable the electronic apparatus to maintain a position that is stable with respect to the wearer's head, the display module 1 may still fall within the eyesight of the wearer.

According to the present disclosure, the electronic apparatus may be an AR apparatus or a VR apparatus. The electronic apparatus may be a wearable AR/VR apparatus, such as a helmet or a pair of glasses having a display function. The disclosed wearing device diversifies the manners of adjusting the accommodating space of the AR/VR apparatus. The electronic apparatus may also be a watch, a pair of shoes, or clothing, that need to adjust the accommodating space.

Figure 3:
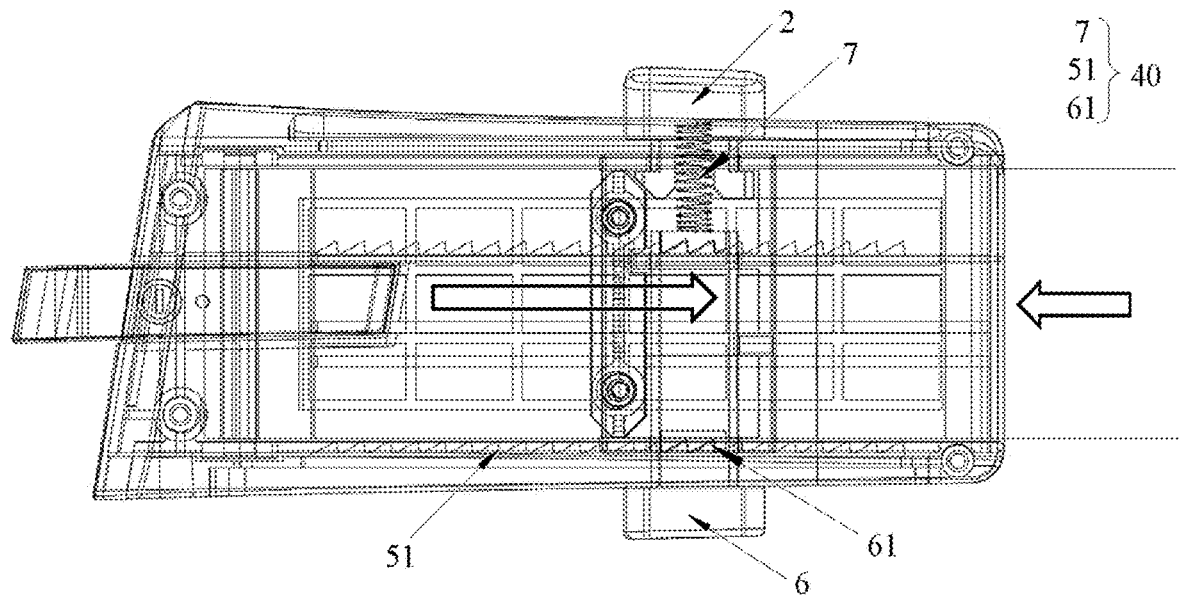
FIG. 3 illustrates a schematic view showing adjustment of a first member to increase an overlapping degree, according to some embodiments of the present disclosure.
Figure 4:
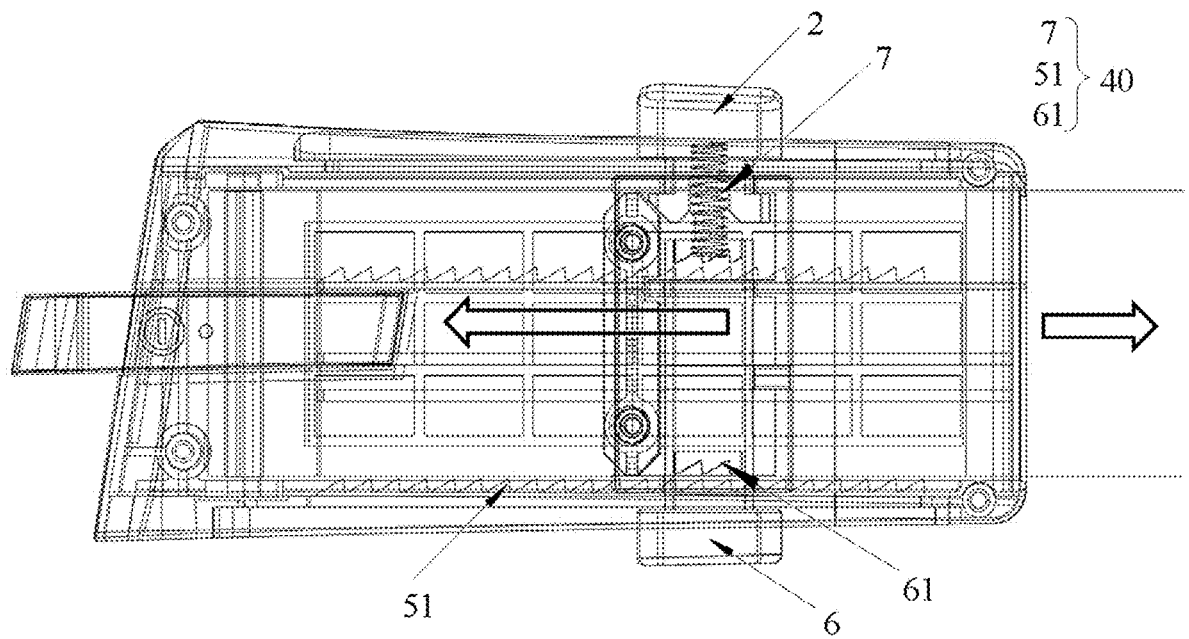
FIG. 4 illustrates a schematic view showing adjustment of a first member to decrease an overlapping degree, according to some embodiments of the present disclosure.
Figure 8:
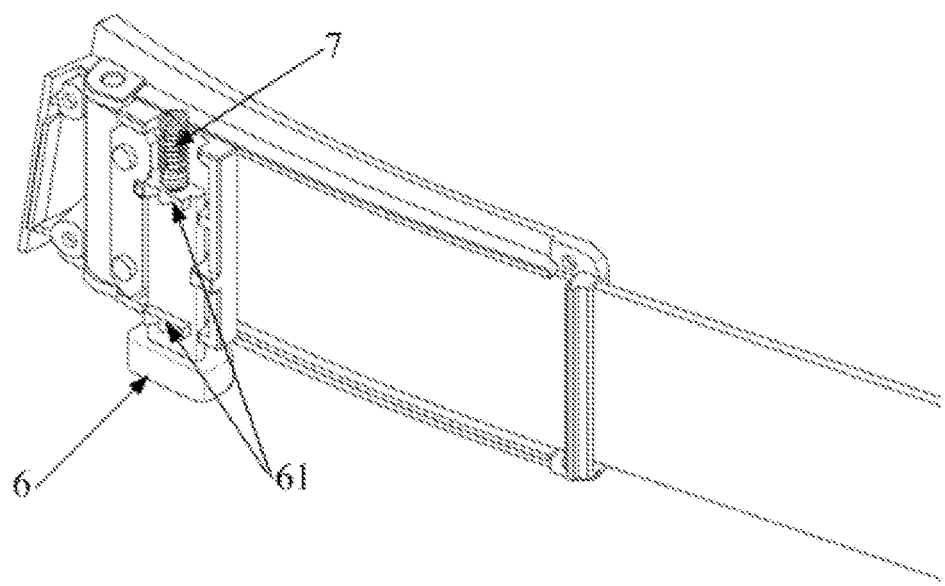
FIG. 8 illustrates a structural schematic view of an inner shell mounted with a spring and a releasing button, according to some embodiments of the present disclosure.

FIG. 3 illustrates a schematic view showing adjustment of a first member to increase an overlapping degree of an adjusting band, according to some embodiments of the present disclosure. FIG. 4 illustrates a schematic view showing adjustment of a first member to decrease an overlapping degree, according to some embodiments of the present disclosure. FIG. 8 illustrates a structural schematic view of an inner shell mounted with an elastic member (e.g., a spring) and a releasing button, according to some embodiments of the present disclosure. As shown in FIG. 3, FIG. 4, and FIG. 8, the releasing button 6 of the first member may be configured with a plurality of sliding teeth 61, and the support shell of the first member may include a plurality of non-return teeth 51. The plurality of non-return teeth 51 may be configured to guide the plurality of sliding teeth 61 to slide one-way, in a direction that increases the overlapping degree of the adjusting band 10.

In some embodiments, the elastic member 7 is configured to drive the plurality of sliding teeth 61 to engage or disengage the plurality of non-return teeth 51. For example, when the releasing button 6 remains released (i.e., not pressed in the direction substantially perpendicular to the first direction), the plurality of sliding teeth 61 are configured to engage the plurality of non-return teeth 51. Thus, when the toggle button 2 and/or the releasing button 6 is pushed to move in the first direction, the plurality of non-return teeth 51 can relatively easily drive the plurality of sliding teeth 61 to move. When the releasing button is pressed in the direction substantially perpendicular to the first direction, the elastic member 7 is pressed to lift up the plurality of sliding teeth 61. Accordingly, the releasing button 6 enables the plurality of sliding teeth 61 to disengage the plurality of non-return teeth 51.

Because the plurality of non-return teeth 51 are configured to guide the plurality of sliding teeth 61 to move one-way, the plurality of sliding teeth 61, the plurality of non-return teeth 51, and the elastic member 7 cooperate to form a locking structure 40. The locking structure 40 may also have structures, such as a buckle. When the dimensions of the accommodating space are adjusted, through cooperation with the buckle head and a buckle hole, the adjusting end of the adjusting band 10 may be fixed with respect to the support shell.

As such, the first member may include the locking structure 40 that locks the overlapping degree by configuring the releasing button 6 with a plurality of sliding teeth 61, configuring the support shell with a plurality of non-return teeth 51, and having the elastic member 7. Accordingly, the stability of the adjusted dimensions of the accommodating space may be improved. That is, once adjusted, the overlapping degree of the adjusting band 10 can be locked by the locking structure, which maintains the dimensions of the accommodating space at fixed values.

Figure 5:
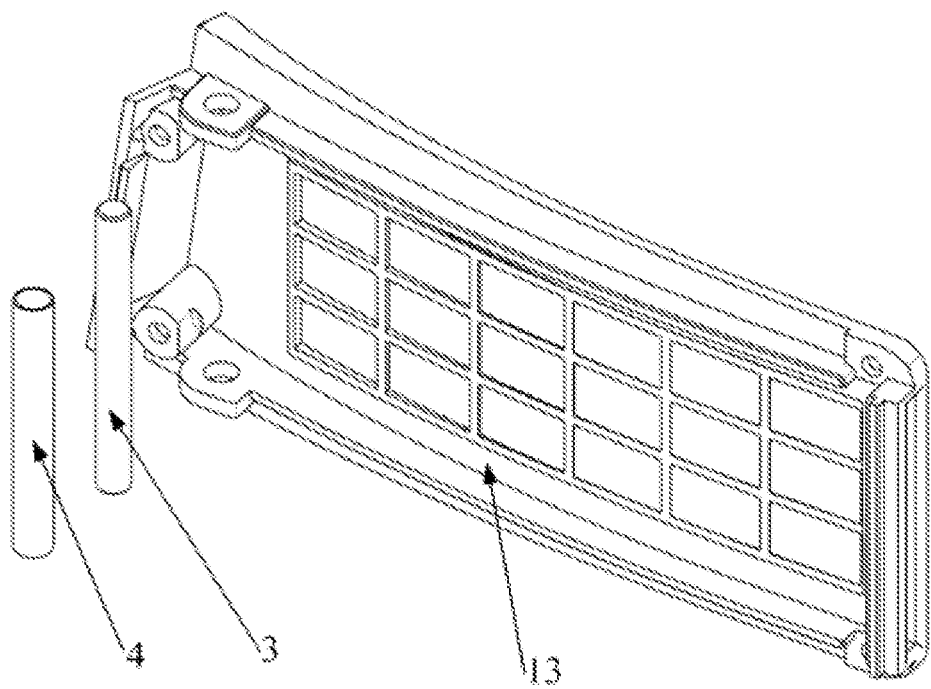
FIG. 5 is a schematic view showing a revolving member being assembled to an inner shell, according to some embodiments of the present disclosure.
Figure 6:
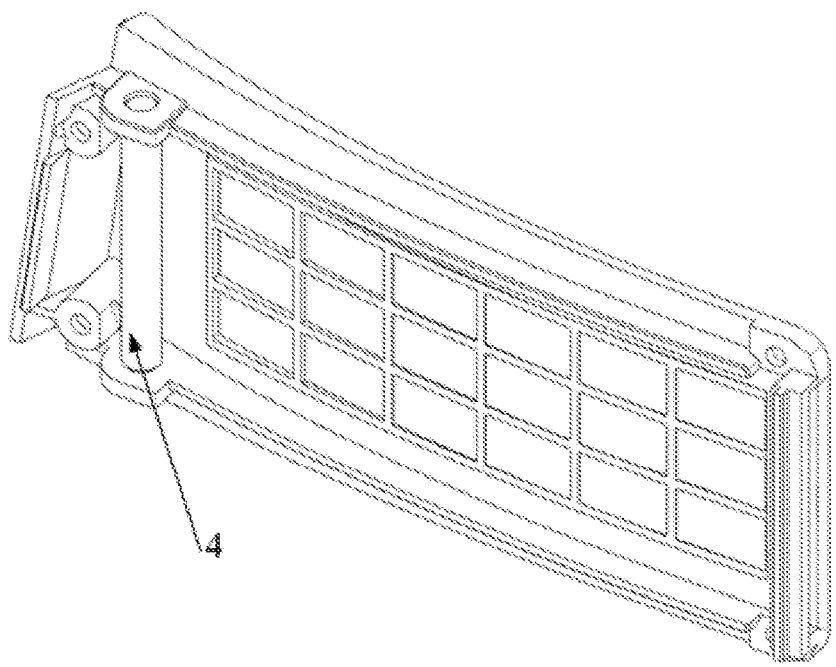
FIG. 6 illustrates a structural schematic view of an inner shell mounted with a revolving member, according to some embodiments of the present disclosure.
Figure 7:
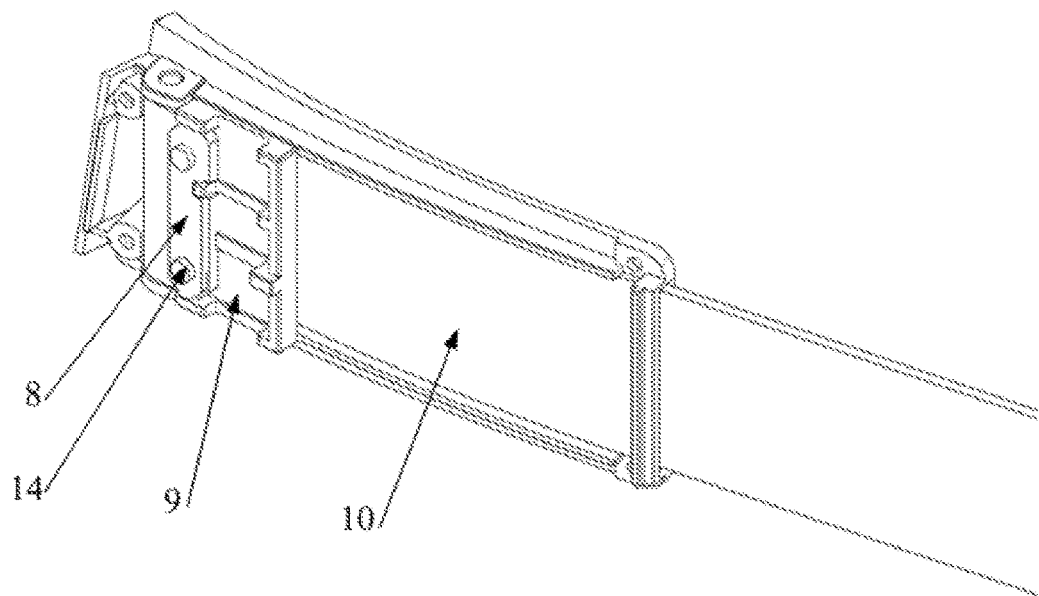
FIG. 7 illustrates a structural schematic view of an inner shell mounted with a sliding block, according to some embodiments of the present disclosure.
Figure 9:
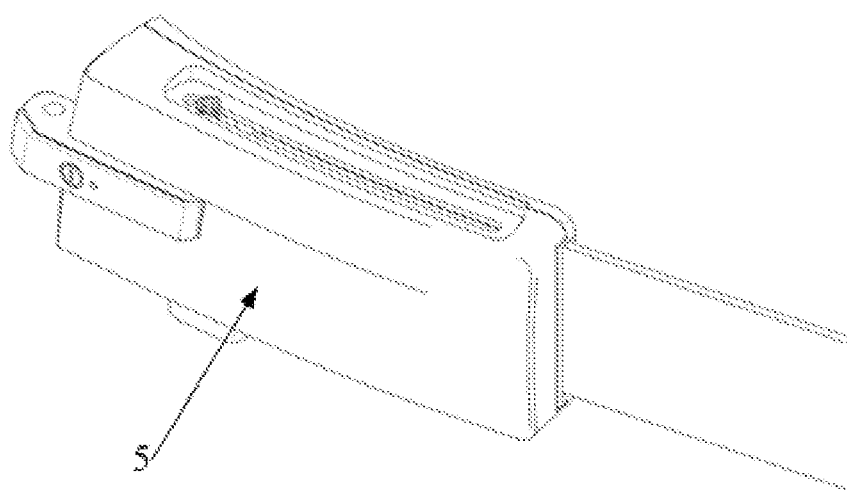
FIG. 9 illustrates a structural schematic view of an inner shell mounted with an outer shell, according to some embodiments of the present disclosure.
Figure 10:
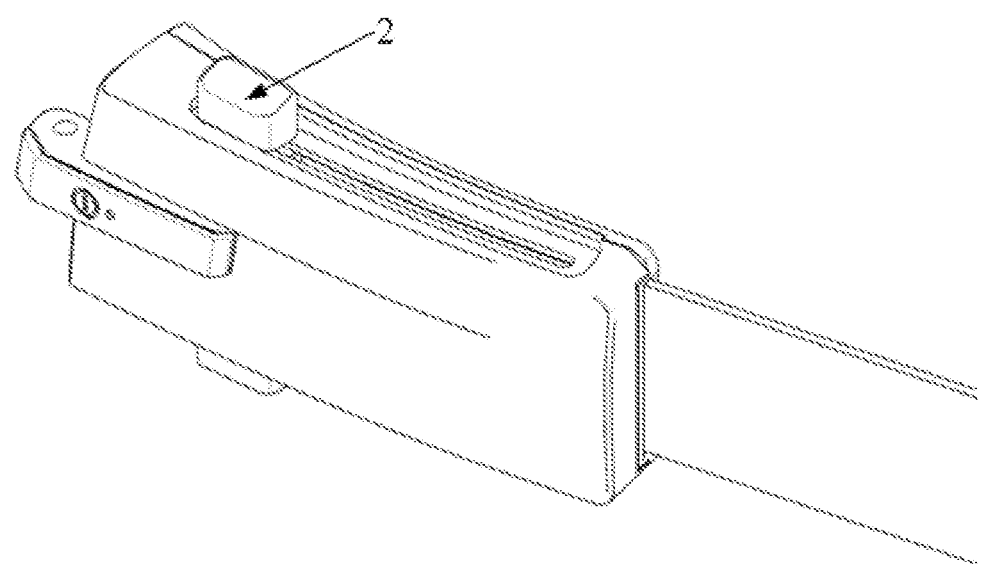
FIG. 10 illustrates a structural schematic view of a support shell mounted with a toggle button, according to some embodiments of the present disclosure.

FIG. 5 is a schematic view showing a revolving member being assembled to an inner shell, according to some embodiments of the present disclosure. FIG. 6 illustrates a structural schematic view of an inner shell mounted with a revolving member, according to some embodiments of the present disclosure. FIG. 7 illustrates a structural schematic view of an inner shell mounted with a sliding block, according to some embodiments of the present disclosure. FIG. 8 illustrates a structural schematic view of an inner shell mounted with a spring and a releasing button, according to some embodiments of the present disclosure. FIG. 9 illustrates a structural schematic view of an inner shell mounted with an outer shell, according to some embodiments of the present disclosure. FIG. 10 illustrates a structural schematic view of a support shell mounted with a toggle button, according to some embodiments of the present disclosure. Referring to FIGS. 5-10, an assembling process of the first member may include the following examples shown in S11-S16.

In S11, mounting a rotating axis 3 and a sleeve 4 onto the inner shell 13, where the sleeve 4 is configured to rotate around the rotating axis 3.

In some embodiments, the sleeve 4 is sleeved on the rotating axis 3 before mounting onto the inner shell 13. The rotating axis 3 and the sleeve 4 may, for example, be fixed at an end portion of the inner shell that is closer to the main device.

In S12, mounting a sliding block, and mounting the adjusting band 10 by folding an adjusting end of the adjusting band 10 around the sleeve 4 to engage with the sliding block 9.

In some embodiments, the sleeve 4 is rotated to drive the adjusting band 10 to move along a first direction, where the first direction is a direction from the main device to the wearing device. In some embodiments, referring to FIG. 1, the sliding block 9 may include a plurality of protrusions, and the adjusting end of the adjusting band 10 may include a plurality of holes, such that the adjusting end engages the sliding block 9 by engaging the plurality of protrusions to the plurality of holes.

In S13, fixing the adjusting end of the adjusting band 10 to the sliding block 9 through a tablet 8 and one or more bolts 14, where the sliding block 9 is configured to slide along the guide slot of the support shell and to guide the movement of the adjusting band 10.

In some embodiments, two bolts 14 are adopted to fix the adjusting end of the adjusting band 10 to the sliding block 9; however, other numbers of the bolts 14 may be used. In some embodiments, the sliding block 9 is configured to guide the adjusting band 10 to move in the first direction.

In S14, mounting the releasing button 6 onto the sliding block 9, and coupling a first end of the elastic member 7 to the releasing button 6.

In some embodiments, the first end of the elastic member 7 may be coupled to the releasing button 6 before mounting the releasing button 6 onto the sliding block 9. The releasing button 6 may include a head portion, and a body portion connected to the head portion. The releasing button 6 may further include a plurality of sliding teeth 61. The plurality of sliding teeth 61 may be disposed at an upper side and a lower side of the body portion.

In S15, mounting the outer shell 5 onto the inner shell 13 to form the support shell that covers a portion of the adjusting band 10.

In some embodiments, the outer shell 5 may include a plurality of non-return teeth 51. The plurality of non-return teeth 51 may be configured to guide the plurality of sliding teeth 61 to slide in a direction that increases or reduces the overlapping degree of the adjusting band 10.

In S16, mounting the toggle button 2, where the toggle button 2 is coupled to a second end of the elastic member 7.

In some embodiments, as shown in FIG. 10, the guide slot is configured at the outer shell 5 of the support shell, and the guide slot allows the toggle button 2 to slide along the first direction. The guide slot may hold a portion of the second end of the elastic member 7, and the toggle button 2 may be coupled to the second end of the elastic member 7 through the guide slot.

The adjusting process of the first member is illustrated hereinafter. When the accommodating space needs to be reduced, the releasing button 6 may remain released and be pushed along with the toggle button 2 in a direction (indicated by the left arrow in FIG. 3) that increases the overlapping degree of the adjusting band 10. Accordingly, under the function of the elastic member 7, the plurality of sliding teeth 61 of the releasing button 6 may slide along with the plurality of non-return teeth 51 of the support shell in a direction that increases the overlapping degree. Because the plurality of non-return teeth 51 guide the movement in the direction that increases the overlapping degree, the plurality of sliding teeth 61 of the releasing button 6 can be moved relatively easily. During this process, the releasing button 6 drags the sliding block 9, along with the adjusting end of the adjusting band 10, to slide relative to the guide slot of the support shell, thereby shortening the adjusting band 10 outside of the support shell for the wearers having a relatively small head circumference. When the adjusting band 10 is adjusted to a comfortable extent, the plurality of non-return teeth 51 and the plurality of sliding teeth 61 are engaged so that both are not able to move. Accordingly, the overlapping degree of the adjusting band 10 is fixed.

When the accommodating space needs to be increased, the releasing button 6 needs to be pressed to compress the elastic member 7, so that the plurality of sliding teeth 61 disengage the plurality of non-return teeth 51. While holding the releasing button 6 pressed, the toggle button 2 and the releasing button 6 are pushed to move in a direction (as indicated by the left arrow in FIG. 4) that decreases the overlapping degree of the adjusting band 10. During this process, the releasing button 6 drags the sliding block 9, along with the adjusting end of the adjusting band 10, to slide relative to the guide slot of the support shell, thereby elongating the adjusting band 10 for wearers that have a relatively large head circumference. When the adjusting band 10 is adjusted to a comfortable extent, the releasing button 6 is no longer pressed, and the plurality of non-return teeth 51 and the plurality of sliding teeth 61 are engaged so that both are not able to move. Accordingly, the overlapping degree of the adjusting band 10 is fixed.

In some embodiments, the first member includes a first sub-unit and a second sub-unit. The first sub-unit and the second sub-unit may each, through the movement of a sliding block 9 along a motion track, adjusts the overlapping degree of a corresponding adjusting band, thereby cooperating to adjust the dimensions of the accommodating space. During the process of adjusting the dimensions of the accommodating space, the aforementioned display module 1 moves with respect to the wearer's head, and the sliding blocks 9 of the first sub-unit and the second sub-unit move in the same direction as the display module 1.

In some embodiments, the guide slot of the support shell may form the motion track, and the motion track provided by the guide slot may be configured to be the same as the moving direction of the display module 1 with respect to the wearer's head. Accordingly, it is ensured that the moving direction of the sliding block 9 matches the moving direction of the display module 1 with respect to the wearer's head.

Referring to FIG. 1, when wearing the disclosed electronic apparatus, if the wearer wants to move the display module 1 in a direction towards his eyes, the wearer may adjust the two sub-units using his hands by making the sliding blocks 9 on two sides of his head to move in the same direction along the aforementioned motion track. That is, the sliding blocks 9 are slid to increase the overlapping degree until the wearer is in a comfort position. During the adjusting process, when the two sub-units are adjusted to increase the overlapping degree to a certain extent, the second member is stretched so that the second member is automatically tightened to make the wearer feel the most comfortable. This also allows the electronic apparatus to stay in a positional relationship that is stable with respect to the wearer.

When taking off the electronic apparatus, the wearer may hold the display module 1 to move in a direction away from his eyes, and the wearer may adjust the two sub-units simultaneously to allow the sliding blocks 9 on two sides of the wearer's head to move in an opposite direction along the motion track. That is, the sliding blocks 9 are slid forwards to reduce the overlapping degree, such that the accommodating space may become large enough for the electronic apparatus to leave the wearer's head. During the adjusting process, when the two sub-units are adjusted so that the overlapping degree is reduced to a certain extent, the tensile strength on the second member disappears, the second member is loosened automatically, and the wearer can take off the electronic apparatus conveniently. Accordingly, by adjusting the first member, the second member may also be adjusted, which facilitates the operation of the electronic apparatus.

As such, when putting on or taking off the disclosed electronic apparatus, it is simple and convenient for the wearer to adjust the degree of tightness of the wearing device. Just as wearing ordinary glasses, during which a wearer holds a pair of ordinary glasses to move it towards his eyes in order to wear the glasses by moving the legs of the glasses backwards, the wearer may hold and move the display module 1 towards his eyes to wear the disclosed electronic apparatus. That is, the wearer may move the display module 1 backwards, and adjust the two sub-units backwards. Similar to the process of taking off ordinary glasses where the wearer uses his hands to move the ordinary glasses in a direction away from his eyes (i.e., forwardly take off the ordinary glasses) and move the legs of the glasses forwards, the wearer may use his hands to hold and move the display module 1 in a direction away from his eyes to take off the disclosed electronic apparatus. That is the wearer may move the display module 1 forwards and forwardly adjust the two sub-units.

That is, the present disclosure utilizes the motion track formed by the guide slot of the support shell and configures the direction of the guide slot to be consistent with the moving direction of the display module 1 with respect to the wearer's head, thereby ensuring the moving direction of the sliding block 9 to match the moving direction of the display module 1. Accordingly, wearing the disclosed electronic apparatus is just like wearing a pair of ordinary glasses, which reduces the difficulty of operating the electronic apparatus and makes it fast, convenient, and comfortable to use the electronic apparatus.

It is understood that the disclosed first sub-unit and the second sub-unit may be adjusted using other manners to change the overlapping degree. For example, by rotating a rotating button or by cooperation through the gears and rack, the shortening or elongating of the adjustment band 10 may be realized, such that the dimensions of the accommodating space are adjusted.

It should also be noted that in some alternative implementations, the functions noted in operations of the electronic apparatus may occur in a different order than that illustrated in this specification. For example, different functions may be executed substantially in parallel, or they may sometimes be executed in the reverse order, depending upon the specific functions involved.

Those skilled in the art can appreciate that various combinations of the features of the embodiments and/or claims of the present disclosure are possible, even if such combinations are not explicitly recited in the present disclosure. In particular, various combinations of the features described in the embodiments and/or claims of the present disclosure can be made without departing from the spirit and scope of the present disclosure. All such combinations fall within the scope of the present disclosure.

Although the present disclosure has been shown and described with respect to the specific exemplary embodiments of the present disclosure, it will be understood by those skilled in the art that variations in form and detail can be made to the present disclosure. Therefore, the scope of the present disclosure should not be limited to the above-described embodiments, but should be determined not only by the appended claims but also by the equivalents of the appended claims.

What is claimed is:

1. An electronic apparatus, comprising:
a main device; and
a wearing device, coupled to the main device and configured to provide an accommodating space that is dimension-adjustable, wherein the accommodating space is configured to accommodate a body part of a wearer and to maintain a relative position relationship between the electronic apparatus and the wearer, wherein the wearing device includes:
a first member connected to the main device and configured to adjust dimensions of the accommodating space manually through a first manner, including:
a support shell;
an adjusting band partially disposed inside the support shell;
a sliding block coupled to an adjusting end of the adjusting band, wherein the support shell is configured with a guide slot to cooperate sliding of the sliding block;
a toggle button slidably coupled to the support shell;
a releasing button, connected to the sliding block, being capable of moving in a direction perpendicular to the first direction, being slidably coupled to the support shell, and including a plurality of sliding teeth; and an elastic member, disposed between the toggle button and the releasing button and configured to drive an engagement between the plurality of sliding teeth and a plurality of non-return teeth of the support shell;

wherein:

the plurality of non-return teeth is configured to guide the plurality of sliding teeth towards a direction that increases the overlapping degree of the adjusting band;

in response to the releasing button being pressed in the direction perpendicular to the first direction, the elastic member is pressed to disengage the plurality of sliding teeth from the plurality of non-return teeth; and the plurality of sliding teeth, the plurality of non-return teeth, and the elastic member form a locking structure; and a second member configured to adjust dimensions of the accommodating space through a second manner different from the first manner, the second member being connected to the main device through the first member.

2. The apparatus according to claim 1, wherein:

an accommodating space adjustment portion of the first member has a first elastic parameter;

an accommodating space adjustment portion of the second member has a second elastic parameter, wherein the first elastic parameter is smaller than the second elastic parameter; and the first member and the second member are configured to support simultaneous adjustment of the dimensions of the accommodating space.

3. The apparatus according to claim 1, wherein:

the first member includes a first state and a second state, and the first manner is configured to adjust a positional relationship to change the first member between the first state and the second state, thereby adjusting the dimensions of the accommodating space.

4. The apparatus according to claim 3, wherein:

the first manner is configured to adjust an overlapping degree of the first member, thereby adjusting the dimensions of the accommodating space; and the first member includes the locking structure that locks the overlapping degree.

5. The apparatus according to claim 4, wherein:

the support shell is configured with the plurality of non-return teeth each including a first side and a second side with a slope of the first side being larger than a slope of the second side;

an overlapping degree of the adjusting band is adjustable along a first direction, and the first direction is a horizontal direction from the main device to the first member; and the toggle button is configured to drive the adjusting end to move along the first direction.

6. The apparatus according to claim 1, wherein:

the second member includes a third state and a fourth state, and the second manner is configured to adjust an elastic deformation of the second member to change the second member between the third state and the fourth state, thereby adjusting the dimensions of the accommodating space.

7. The apparatus according to claim 1, wherein:

the first member includes a first sub-unit and a second sub-unit, the first sub-unit is connected to a first end of the main device and a third end of the second member, the second sub-unit is connected to a second end of the main device and a fourth end of the second member, the first end is opposite to the second end, and the third end is opposite to the fourth end.

8. The apparatus according to claim 7, wherein:

the second member includes a first local part, a second local part, and an interval region, wherein a first end of the first local part and a first end of the second local part form the third end connecting to the first sub-unit, and a second end of the first local part and a second end of the second local part form the fourth end of connecting to the second sub-unit.

9. The apparatus according to claim 1, wherein:

the main device includes a display module configured to output display data towards the accommodating space, such that the accommodating space allows the electronic apparatus to stay stable in a position with respect to a wearer's head, and the display module falls within wearer's eyesight.

10. The apparatus according to claim 7, wherein:

the main device includes a display module configured to output display data;

the first sub-unit and the second sub-unit are configured to respectively adjust an overlapping degree of a corresponding adjusting band through movement of a corresponding sliding block, thereby adjusting dimensions of the accommodating space; and in response to adjustment of the dimensions of the accommodating space, the display module, the sliding block of the first sub-unit, and the sliding block of the second sub-unit move in a same direction.

11. A method, comprising:

providing an electronic apparatus, the electronic apparatus including:

a main device; and a wearing device, coupled to the main device and configured to provide an accommodating space that is dimension-adjustable, the accommodating space being configured to accommodate a body part of a wearer and to maintain a relative position relationship between the electronic apparatus and the wearer, the wearing device including:

a first member connected to the main device and configured to adjust dimensions of the accommodating space through a first manner, including:

a support shell;

an adjusting band partially disposed inside the support shell;

a sliding block coupled to an adjusting end of the adjusting band, wherein the support shell is configured with a guide slot to cooperate sliding of the sliding block; and a toggle button slidably coupled to the support shell; and a second member configured to adjust dimensions of the accommodating space through a second manner different from the first manner, the second member being connected to the main device through the first member; and coupling the wearing device to the main device to provide the accommodating space;

wherein:
the first member is configured by:
providing a rotating axis and a sleeve to an inner shell of the support shell for the wearing device of the electronic apparatus, wherein the sleeve is configured to rotate around the rotating axis;
mounting the adjusting band by folding an adjusting end of the adjusting band around the sleeve, wherein an overlapping degree of the adjusting band is adjustable along a first direction, the first direction is a horizontal direction from the main device to the first member;
mounting the sliding block so that the adjusting end of the adjusting band engages the sliding block, wherein the sliding block is configured to guide a movement of the adjusting band along the guide slot of the support shell;
mounting a releasing button onto the sliding block, wherein the releasing button is coupled to an elastic member;
mounting an outer shell onto the inner shell to form the support shell; and
mounting the toggle button, wherein the elastic member is disposed between the releasing button and the elastic member;
the releasing button includes a plurality of sliding teeth, wherein the releasing button is capable of moving in a direction perpendicular to the first direction;
the support shell is configured with a plurality of non-return teeth each including a first side and a second side with a slope of the first side being larger than a slope of the second side; and
the plurality of non-return teeth are configured to engage and guide the plurality of sliding teeth to move in a direction that increases the overlapping degree of the adjusting band.

12. The method according to claim 11, wherein:
an accommodating space adjustment portion of the first member has a first elastic parameter;
an accommodating space adjustment portion of the second member has a second elastic parameter, wherein the first elastic parameter is smaller than the second elastic parameter; and
the first member and the second member are configured to support simultaneous adjustment of the dimensions of the accommodating space.

13. The method according to claim 11, wherein:
the first member includes a first state and a second state, and
the first manner is configured to adjust a positional relationship to change the first member between the first state and the second state, thereby adjusting the dimensions of the accommodating space.

14. The method according to claim 11, wherein:
in response to the releasing button being pressed in the direction perpendicular to the first direction, the elastic member is pressed to disengage the plurality of sliding teeth from the plurality of non-return teeth.

15. The method according to claim 11, wherein:
the plurality of sliding teeth, the plurality of non-return teeth, and the elastic member form a locking structure.

16. An electronic apparatus, comprising:
a main device; and
a wearing device, coupled to the main device and configured to provide an accommodating space that is dimension-adjustable, wherein the accommodating space is configured to accommodate a body part of a wearer and to maintain a relative position relationship between the electronic apparatus and the wearer, wherein the wearing device includes:
a first member configured to adjust dimensions of the accommodating space through a first manner, including:
a support shell configured with a plurality of non-return teeth that move one-way in a single direction;
an adjusting band partially disposed inside the support shell, wherein an overlapping degree of the adjusting band is adjustable along a first direction, and the first direction is a direction from the main device to the first member;
a sliding block coupled to an adjusting end of the adjusting band, wherein the support shell is configured with a guide slot to cooperate sliding of the sliding block;
a toggle button, configured to drive the adjusting end to move along the first direction, wherein the toggle button is slidably coupled to the support shell;
a releasing button, connected to the sliding block, being capable of moving in a direction perpendicular to the first direction, being slidably coupled to the support shell, and including a plurality of sliding teeth; and
an elastic member, disposed between the toggle button and the releasing button and configured to drive an engagement between the plurality of sliding teeth and plurality of non-return teeth;
wherein:
the plurality of non-return teeth is configured to guide the plurality of sliding teeth towards a direction that increases the overlapping degree of the adjusting band;
in response to the releasing button being pressed in the direction perpendicular to the first direction, the elastic member is pressed to disengage the plurality of sliding teeth from the plurality of non-return teeth; and
the plurality of sliding teeth, the plurality of non-return teeth, and the elastic member form the locking member; and
a second member configured to adjust dimensions of the accommodating space through a second manner different from the first manner.

* * * * *